United States Patent
Leschuk et al.

(10) Patent No.: US 8,165,768 B2
(45) Date of Patent: Apr. 24, 2012

(54) METHOD FOR DETERMINING TRAILER BRAKING OUTPUT

(75) Inventors: Robert W. Leschuk, Oxford, MI (US);
John X. Cui, Rochester Hills, MI (US);
Jiande Wu, Livonia, MI (US); Thomas A. Schuelke, Ann Arbor, MI (US);
Katherin Hartman, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1112 days.

(21) Appl. No.: 12/028,060

(22) Filed: Feb. 8, 2008

(65) Prior Publication Data

US 2009/0204303 A1  Aug. 13, 2009

(51) Int. Cl.
*B60B 39/00* (2006.01)
*B60T 7/00* (2006.01)
*G06F 7/00* (2006.01)

(52) U.S. Cl. ............... 701/70; 701/71; 701/80; 701/81; 701/82; 303/20; 303/123

(58) Field of Classification Search ............. 188/1.11 E, 188/1.11 R, 3 R; 280/423.1, 427, 428; 303/3, 303/7, 20, 123; 340/453; 701/70, 71, 76, 701/77, 78, 79, 80, 81, 82, 83
See application file for complete search history.

(56) References Cited

U.S. PATENT DOCUMENTS

| 5,785,393 | A  * | 7/1998 | McGrath et al. ............... 303/7 |
| 6,966,613 | B2   | 11/2005 | Davis |
| 7,204,564 | B2 * | 4/2007 | Brown et al. .................. 303/7 |
| 7,522,986 | B2 * | 4/2009 | Kitapini et al. ............... 701/70 |
| 2006/0214506 | A1 * | 9/2006 | Albright et al. ............ 303/123 |
| 2008/0172163 | A1 * | 7/2008 | Englert et al. ............... 701/83 |
| 2008/0177454 | A1 * | 7/2008 | Bond et al. .................. 701/70 |
| 2010/0152989 | A1 * | 6/2010 | Smith et al. ................. 701/78 |

* cited by examiner

*Primary Examiner* — Tony H. Winner
*Assistant Examiner* — Marc Scharich
(74) *Attorney, Agent, or Firm* — Lionel D. Anderson; Reising Ethington P.C.

(57) ABSTRACT

A method for providing a trailer equipped with trailer brakes with an electronically controlled trailer braking output to help slow a vehicle/trailer combination as quickly as possible, but in a stable and balanced manner. In situations where a low friction environment is detected, such as a wet or icy road, the present method can brake the trailer in a more aggressive manner than a gain setting would normally allow. This gain-independent segment of the trailer braking output can result in a shorter stopping distance for the vehicle/trailer combination, without causing excessive trailer wheel lockup.

19 Claims, 3 Drawing Sheets

METHOD FOR DETERMINING TRAILER BRAKING OUTPUT

TECHNICAL FIELD

The present invention generally relates to trailer braking and, more particularly, to a method for determining trailer braking output for a trailer that is towed behind a vehicle and has its own brakes.

BACKGROUND

Trailer brakes are required and/or recommended in a number of different towing situations. For instance, if the tow vehicle has a gross vehicle weight rating (GVWR) over a certain amount, if the trailer has a certain number of axles, or if the trailer exceeds a predetermined weight, then trailer brakes may be appropriate. Trailer brakes can sometimes be useful in situations where the combined weight of the tow vehicle and the trailer warrants an extra set of brakes to help bring the vehicle and trailer to a stop in a quick but stable manner.

Some of the more common types of trailer brakes include surge brakes, electric brakes and, more recently, electric-over-hydraulic (EOH) brakes. Surge brake systems are typically non-electronically controlled systems that generally have a hydraulic piston mounted in the tongue of the trailer so that when the vehicle stops, the forward momentum or inertia of the trailer applies pressure on the piston and engages it. The hydraulic piston is coupled to the trailer brakes, which are typically of the drum or disc variety, and activates them in proportion to the amount of inertial engagement that it experiences. Thus, surge brake systems can generally operate without an electrical connection to the tow vehicle, although one may be needed for other features.

Electric brake systems, on the other hand, are electronically controlled systems that generally operate with the assistance of a magnet-driven actuating lever and require an electrical connection to the tow vehicle in order to receive a control signal. The control signal can include a voltage- and/or current-controlled signal that is proportional to a driver braking intent (DBI). The control signal causes a magnet inside of each brake to become energized, which in turn moves an actuating lever that applies the brake. In most cases, electric brake systems are used with drum brakes.

EOH brake systems are typically electronically controlled systems that drive a closed hydraulic system located on the trailer. More specifically, electronic control signals can be used to turn on a hydraulic pump, which in turn builds pressure for braking. Both disc and drum brakes can be used with most EOH brake systems.

SUMMARY OF THE INVENTION

According to one embodiment, there is provided a method for determining trailer braking output for a trailer that is towed behind a vehicle. The method comprises the steps of: (a) receiving vehicle braking input that is representative of vehicle braking conditions; and (b) if the vehicle braking input indicates the presence of a low friction environment, then determining trailer braking output that has at least one gain-independent segment.

According to another embodiment, there is provided a method that comprises the steps of: (a) receiving a gain setting; (b) receiving an ABS status signal from an antilock braking system (ABS); and (c) if the ABS status signal indicates that the ABS is currently active, then determining trailer braking output that has at least one segment where the trailer brakes are braked in a more aggressive manner than the gain setting would normally allow.

According to another embodiment, there is provided a method that comprises the steps of: (a) receiving vehicle braking input that includes a first vehicle braking input and a second vehicle braking input; (b) receiving a gain setting from a gain adjustment device; and (c) if the first vehicle braking input indicates that the ABS is active, then utilizing the second vehicle braking input and the gain setting to provide trailer braking output that includes at least one gain-independent segment and at least one gain-dependent segment.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The method described herein is generally directed to providing a trailer with trailer braking output to help slow the vehicle/trailer combination as quickly as possible, but in a stable and balanced manner. In situations where a low friction environment is detected, such as a wet or icy road, the present method can brake the trailer in a more aggressive manner than the gain setting would normally allow. This can result in a shorter stopping distance for the vehicle/trailer combination, without causing excessive trailer wheel lockup.

Trailer Brake System—

Figure 1:
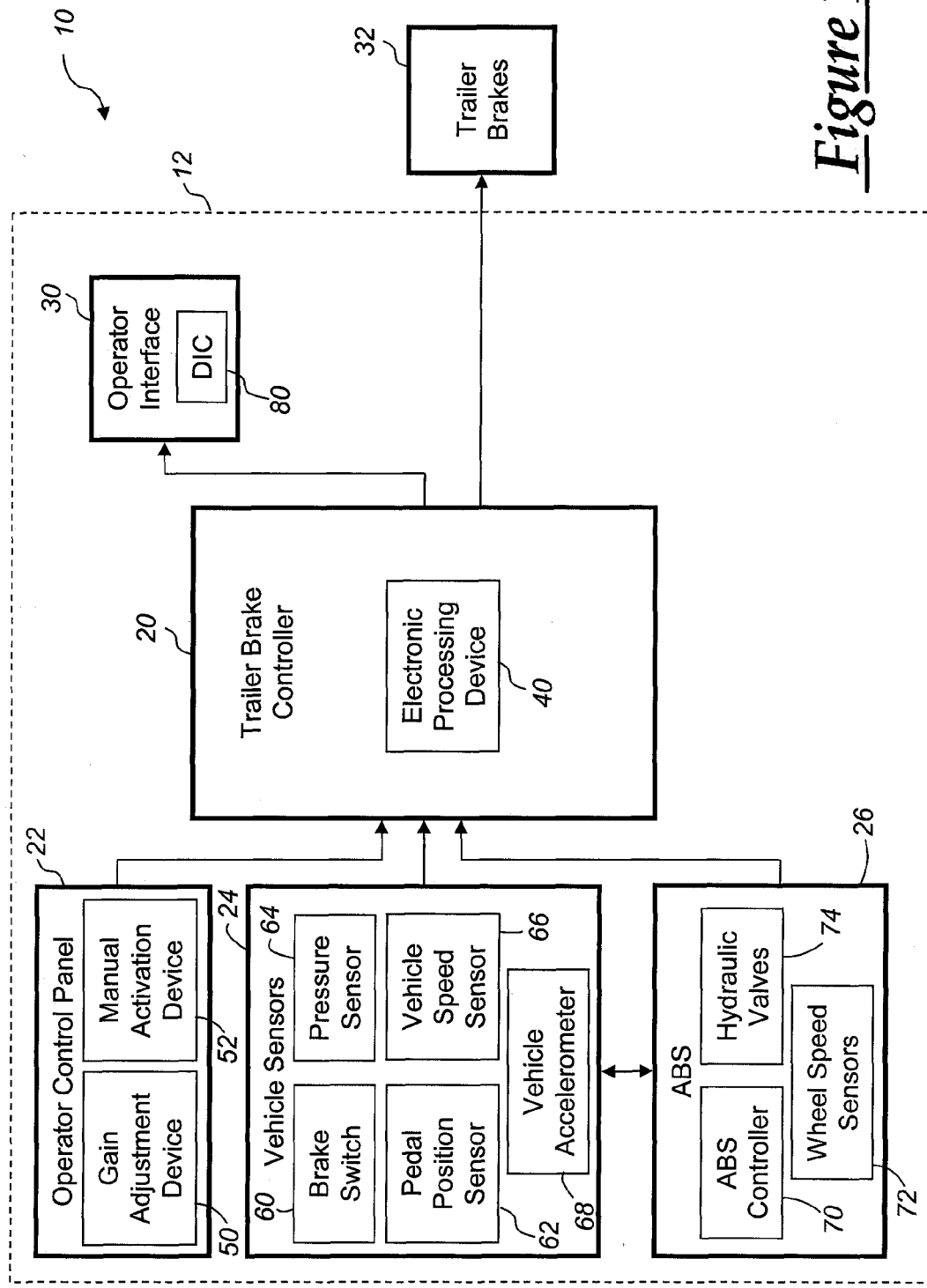
FIG. 1 is a block diagram showing some of the components of an exemplary embodiment of a trailer brake system that is capable of implementing the present method.

With reference to FIG. 1, there is shown a block diagram of an exemplary trailer brake system 10 that is capable of implementing the present method. Although the present method is described in the context of an original equipment manufacturer (OEM) trailer brake system having electric brakes, it should be appreciated that the present method can also be used with one of a number of different trailer braking systems including, but certainly not limited to, OEM systems, aftermarket systems, electric brake systems, and EOH brake systems. According to this particular embodiment, trailer brake system 10 generally includes a trailer brake controller 20 that receives electronic input from an operator control panel 22, one or more vehicle sensors 24, and an anti-lock brake system (ABS) 26, and sends electronic output to an operator interface 30 and trailer brakes 32.

Trailer brake controller 20 is an electronic device or module that is typically located in tow vehicle 12—although it could be located in the trailer—and generally controls the operation of trailer brakes 32 by executing various electronic instructions, including those related to the present method.

According to one embodiment, trailer brake controller 20 includes an electronic processing device 40, although analog processing devices could also be used, as well as inputs, outputs, and any other suitable componentry that is known in the art. Because the individual hardware components and the overall arrangement of a trailer brake controller is generally known in the art, a detailed description of such has been omitted.

Operator control panel 22 gives operators a means for setting and controlling certain parameters and for engaging certain features of the trailer brake system 10. As an example, operator control panel 22 can include a gain adjustment device 50 that enables an operator to control or adjust the gain setting. The trailer brakes usually apply a braking force that is related to the vehicle braking event; thus, the "gain setting" broadly refers to the relationship between the trailer braking output and one or more vehicle braking inputs. The gain setting can be expressed in terms of a percentage, a ratio, a decimal logarithm, etc. The operator typically tries to optimize the gain setting by adjusting it to as high a setting as is possible, but just below the point where the trailer braking output results in a trailer wheel lockup. This calibration or adjustment should be performed each time the towing conditions change—which includes changes to the road surface, the tow vehicle, or the trailer being towed. According to one embodiment, the gain setting can be adjusted between 0% and 100% in 5% intervals. If, for example, the operator sets the gain setting to 20%, then the trailer braking output is proportional to the vehicle braking input up to the point where the trailer braking output reaches 20% of its maximum realizable output level; i.e., the maximum amount that the trailer can brake. Once 20% of this maximum realizable output level is achieved, no further increase in trailer braking output is realized, even if the vehicle braking input increases—this assumes normal stopping conditions.

Operator control panel 22 can also include a manual activation device 52 that enables the operator to manually engage trailer brakes 32 without engaging the vehicle brakes. This type of "trailer only braking" is sometimes used during the gain adjustment or calibration just described. The operator drives the vehicle/trailer combination above at a certain speed, engages only the trailer brakes with manual activation device 52, and then observes the stopping performance; i.e. how quickly did the vehicle/trailer combination come to a stop, did the trailer brakes lockup, etc. Adjustments can then be made to the gain setting based on the stopping performance.

Vehicle sensors 24 can include any sensor or device capable of providing trailer brake controller 20 with information relating to speed, deceleration, braking conditions, driver braking intent, or other braking-related matters concerning the vehicle. For instance, vehicle sensors 24 can include devices that report data regarding the desired vehicle braking: a brake switch 60 that indicates whether or not the brake pedal is engaged, a pedal position sensor 62 that determines the position of the brake pedal, a pressure sensor 64 that verifies the pressure in a vehicle master cylinder or a particular wheel braking circuit, etc. Vehicle sensors 24 can also include devices that report data regarding the actual vehicle braking: a vehicle speed sensor 66 that determines the speed of the vehicle, a vehicle accelerometer 68 that measures how quickly the vehicle is accelerating or decelerating, individual wheel speed sensors (shown here in the context of the ABS), etc. It should be appreciated that while vehicle sensors 24 are schematically shown communicating directly with trailer brake controller 20, it is anticipated that one or more of these devices can communicate with the trailer brake controller through ABS 26 or through any other suitable device or channel in the vehicle.

Antilock braking system (ABS) 26 is a system that generally prevents the vehicle wheels from locking up when the vehicle brakes are applied, as is widely known in the art. Typically, an ABS includes an electronic ABS controller or module 70, wheel speed sensors 72 for each of the vehicle wheels, and two or more hydraulic valves 74 on a brake circuit. The wheel speed sensors 72 could be in addition to or in lieu of one or more of the vehicle sensors 24 previously described, and could instead be located outside of the ABS 26. ABS controller 70 constantly monitors wheel speed sensors 72 and looks for situations where one or more of the wheels are rotating significantly slower than the others. In this case, ABS controller 70 senses the wheel speed inequality and controls hydraulic valves 74 so that the amount of braking force applied to the slow wheel is manipulated—usually by reducing the amount of braking force to that wheel—and wheel lockup is avoided. Of course, various types of ABSs can be used, including more sophisticated systems having additional features such as wheel angle sensors, gyroscopic sensors, etc. Again, FIG. 1 schematically shows ABS 26 in communication with vehicle sensors 24, however, one or more of the sensors could be incorporated into ABS 26, they could be independent devices located elsewhere in the vehicle, or they could be designed according to some other suitable arrangement known to skilled artisans.

Operator interface 30 provides the operator with an audible, visual and/or haptic interface for communicating information with trailer brake system 10. It is preferable, although not necessary, that operator interface 30 be an integrated part of an overall display, such as a driver information center (DIC) 80. This way, there is no additional cost for providing the interface, as it utilizes existing equipment. Operator interface 30 can convey various pieces of information to the operator, including the trailer connection status, the trailer brake system operational status, the gain currently selected by the operator, the amount of trailer braking output currently being applied, error messages, or any other information that the operator may need. Most often, operator interface 30 is in the form of a visual display showing graphics and/or text, however, the interface could also be accomplished by using any combination of telltales, text messages, graphical displays, audible signals, haptic indications, as well as any other known techniques for communicating with the operator.

Trailer brakes 32, as their name suggests, are located on the trailer and are designed to assist in bringing the vehicle/trailer combination to a quick and stable stop. Trailer brakes 32 can include any suitable combination of disk brakes, drum brakes, electric brakes, EOH brakes, or other braking devices known in the art. According to one embodiment, trailer brakes 32 are drum brakes that are electronically controlled by trailer brake system 10. Although not shown, the trailer braking output generated by trailer brake controller 20 can be transmitted to trailer brakes 32 through one or more driver modules or other appropriate devices. In one embodiment, a solid state relay (SSR) driver module is coupled between an output of trailer brake controller 20 and an input of trailer brakes 32, and includes an electro-mechanical relay and a field effect transistor (FET) for operably connecting to a battery.

It should again be emphasized that the trailer brake system 10 just described is only an example of a trailer brake system that can utilize the present method. Other trailer brake systems having other combinations of components, devices, modules, etc. could also be used with the present method.

Method for Determining Trailer Braking Output—

Figure 2:
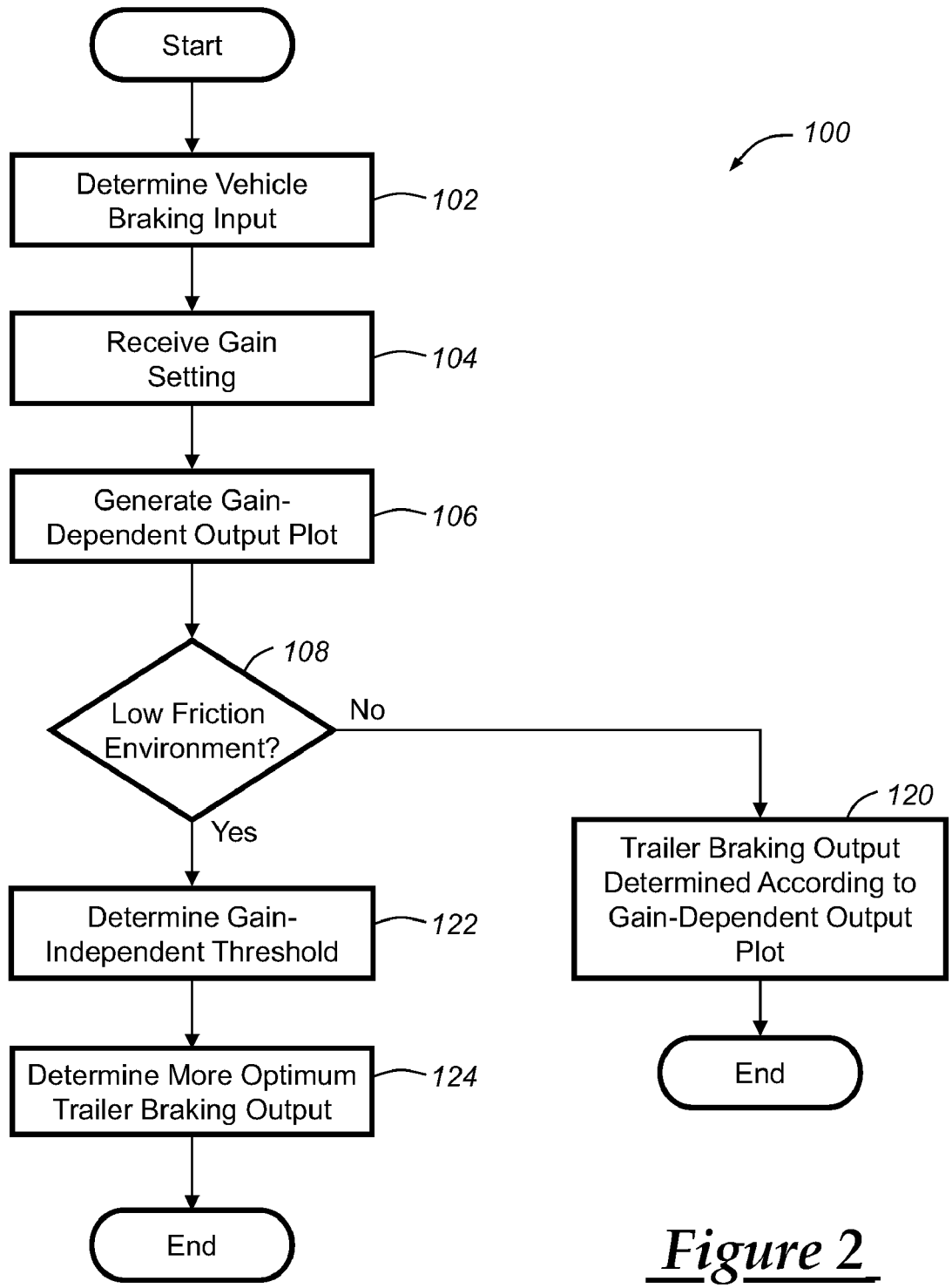
FIG. 2 is a flowchart illustrating some of the steps of an embodiment of the present method.

Turning now to FIG. 2, there is shown a flowchart that illustrates some of the steps of an embodiment 100 of the present method. As previously mentioned, the trailer braking output can be scaled, with respect to the vehicle braking input, through the operator-controlled gain adjustment device 50. Typically, the gain setting results in the electronically-controlled trailer braking output being proportional to the vehicle braking input; the proportionality can be linear, exponential, or involve some other relationship, for example. The present method detects instances where the trailer braking system can advantageously depart from the relationship dictated by the gain-setting and drive the trailer brakes in a gain-independent fashion, which usually entails driving the trailer brakes in a more aggressive fashion for some portion of the overall braking event.

Step 102 first determines vehicle braking input, which broadly includes any information pertaining to the desired or actual braking of the vehicle or the vehicle/trailer combination. According to one embodiment, vehicle braking input includes information from brake switch 60, pedal position sensor 62, pressure sensor 64, antilock braking system (ABS) 26, other indicators of desired vehicle braking, or a combination thereof. On the other hand, vehicle braking input can also include information from vehicle speed sensor 66, vehicle accelerometer 68, wheel speed sensors 72, other indicators of actual vehicle braking, or a combination thereof. One reason for drawing a distinction between desired and actual vehicle braking is because the braking response that is desired by the driver does not always immediately and exactly translate to the vehicle. Conditions such as wet and icy roads, gravel and other loose road surfaces, worn tires, etc. can create a situation where pedal position sensor 62 indicates that the brake pedal is fully engaged (desired vehicle braking), yet vehicle accelerometer 68 is only registering a slight decrease in speed (actual vehicle braking). The various types of desired vehicle braking indicators are sometimes collectively referred to as driver braking intent (DBI). It should be noted that various combinations of desired and/or actual vehicle braking information, as well as other vehicle braking information, can be gathered in step 102 as vehicle braking input and used by the present method.

Next, the method receives a gain setting, step 104. As described above, the gain setting can be provided by the operator via the manually-operated gain adjustment device 50. Alternatively, a gain setting could be automatically calculated by trailer brake controller 20 or some other electronic device located in the vehicle or trailer. Once the gain setting is acquired, step 106 can generate a gain-dependent output plot having several different gain-dependent segments, as will now be described.

Figure 3:
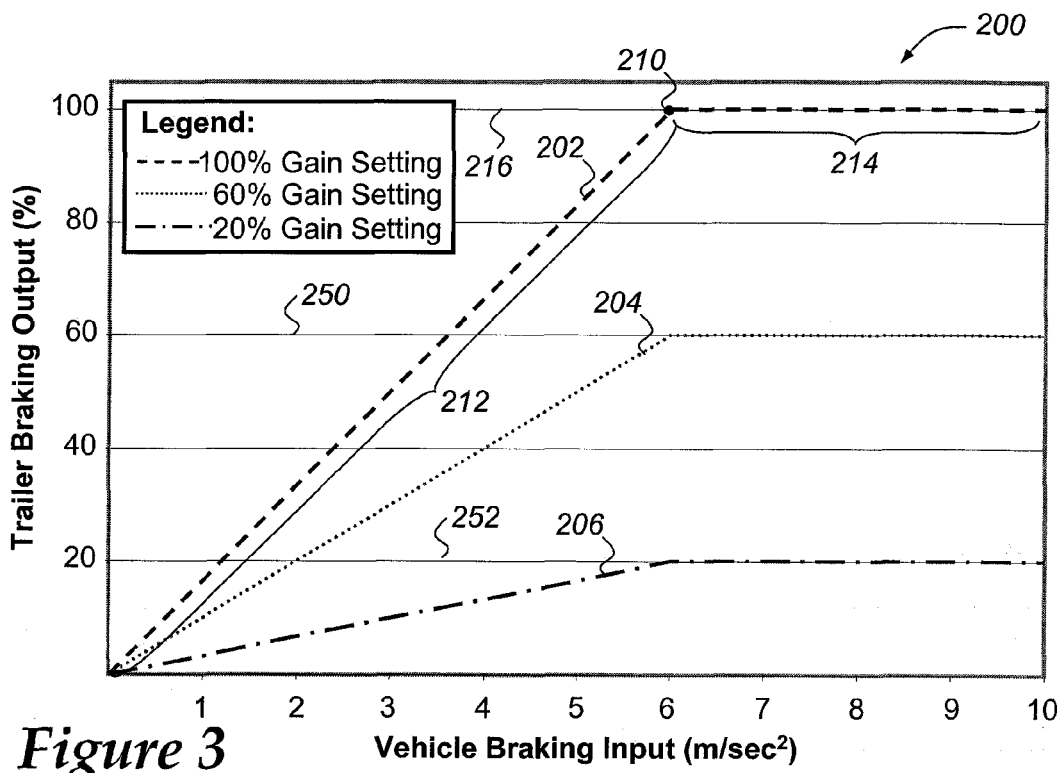
FIG. 3 is a graph illustrating some of the steps in the flowchart of FIG. 2, including steps where a trailer braking output plot having only gain-dependent segments is determined.

With reference to FIG. 3, there is shown an exemplary graph 200 that helps illustrate certain aspects of step 106. It should be appreciated that various techniques, mathematical or otherwise, could be employed when generating a gain-dependent output plot, a process sometimes referred to as "scaling." In graph 200, vehicle braking input is shown on the horizontal- or x-axis, and trailer braking output is represented on the vertical- or y-axis. In this particular embodiment, vehicle deceleration data (m/sec$^2$) is determined from one or more of the vehicle sensors and is used as the vehicle braking input; this is an example of actual vehicle braking input. Three different gain-dependent output plots 202, 204 and 206 are shown for purposes of illustration and correspond to operator-selected gain settings of 100%, 60% and 20%, respectively. It should be pointed out that gain-dependent output plots 202, 204 and 206 generally correspond to trailer braking output before being modified by the present method; i.e. they generally correspond to standard trailer braking output plots.

In gain-dependent output plot 202, when the vehicle is decelerating at a rate of approximately 1 m/sec$^2$, the trailer braking output is slightly less than 20% of its maximum realizable output level. As the deceleration of the vehicle increases, so too does the trailer braking output as a percentage of the maximum realizable output level. This proportional relationship continues until a gain-dependent threshold 216 is reached (in this case, threshold 216 corresponds to a 100% operator-selected gain setting); the point 210 where this transition occurs is sometimes referred to as a "knee point." After the knee point, any additional increase in vehicle braking input will have no effect on the trailer braking output; i.e.—it remains generally constant at the gain-dependent threshold 216.

It follows that each of the gain-dependent output plots 202, 204 and 206 have at least two segments: a gain-dependent scaled segment 212 in which the trailer braking output changes in proportion to the vehicle braking input, and a gain-dependent threshold segment 214 where the trailer braking output remains relatively constant at a gain-dependent threshold, such as threshold 216. At lower deceleration levels, the gain-dependent scaled segment 212 typically coincides with what are considered low and/or mid friction environments (icy, wet and gravel road surfaces, to name but a few examples), while the gain-dependent threshold segment 214 generally extends through what can be deemed high friction environments (this can include dry asphalt and cement road surfaces, for example). It should, of course, be understood that the gain-dependent output plots in FIG. 3 are simply representative of an exemplary embodiment and that the exact shape of the plots or segments, the values of the data points or thresholds, the positions of the knee points, etc. could differ from those shown here. Different gain-dependent segments, other than those shown in the drawings, could also be used and employed by the present method.

Turning back to the flowchart in FIG. 2, the method next determines if the vehicle is experiencing a low friction environment, step 108. One method for determining this is by communicating with ABS 26. In this embodiment, the ABS controller 70 receives data from one or more sensors, processes the sensor data, and generates an ABS status signal that is generally representative of the operational status of the ABS module; i.e.—whether or not the ABS is presently contributing to the braking of the vehicle. This embodiment has the advantage of utilizing the resources of the ABS 26, which is already looking for low friction environments where wheel lockup is likely to occur. It is possible, however, for trailer brake controller 20 to receive the sensor data directly from the sensors and determine the presence of a low friction environment on its own—any of the vehicle braking inputs discussed in step 102, for example, could provide this sensor data. These are only two possibilities, as other methods of determining low friction environments in step 108 could also be employed.

If a low friction environment is not detected, then step 120 simply provides trailer braking output according to a gain-dependent output plot, such as those shown in FIG. 3 (the specific plot depends on the gain setting selected by the operator, and more gain settings than the three exemplary settings shown in FIG. 3 could be used). Generally, it is unnecessary to make further adjustments to the trailer braking output because the braking response shown in the gain-dependent output plots is designed primarily for higher friction environments. At this point, the method could end.

If, however, a low friction environment is detected, then step 122 determines a gain-independent threshold 330. To help illustrate the gain-independent threshold, it is helpful to refer to chart 300 in FIG. 4. Oftentimes, in low friction environments like icy and wet roads the vehicle is unable to quickly stop; this results in a low vehicle deceleration value (on the horizontal- or x-axis). Thus, the gain-dependent or scaled trailer braking output is only a fraction of the maximum realizable output level—e.g., in the case where vehicle braking input is 1 m/sec$^2$, the trailer braking output is slightly less than 20% of the maximum realizable output level. This under-gained or under-braked situation can be exacerbated by drivers who make additional manual reductions to the gain setting through gain adjustment device 50 in an attempt to compensate for low friction environments, such as icy or wet roads. In these low friction environments, the gain-dependent trailer braking output can result in a less than optimum braking balance between the vehicle and the trailer. Put differently, the road surface—even though it is a low friction surface—can support more aggressive braking without causing excessive trailer wheel lockup; this is particularly true at low deceleration values. Thus, the need for gain-independent segments, which are generally determined without regard to the particular gain setting that has been selected by the driver.

Gain-independent threshold 330 is determined independently of the gain selected by the operator, and is therefore the same for plots 202, 204, and 206. The gain-independent threshold 330 can be a permanent value written into the memory resources of the trailer brake controller 20, or it can be a variable value that is periodically adjusted by the trailer brake controller, the operator, a back-end facility, or some other source. The gain-independent threshold 330 can be determined through actual trailer brake testing, through the performance of software modeling, or according to other techniques known to those skilled in the art.

Figure 4:
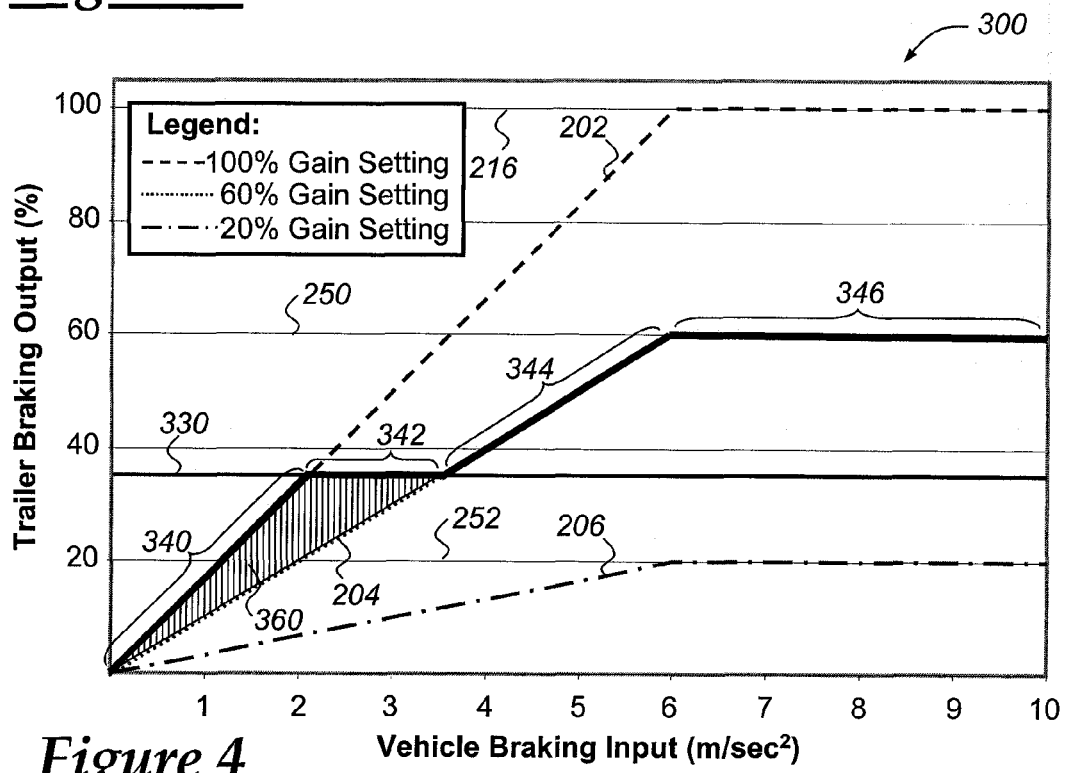
FIG. 4 is a graph illustrating some of the steps in the flowchart of FIG. 2, including steps where a trailer braking output plot having both gain-dependent and gain-independent segments is determined.

Next, step 124 determines a more optimum trailer braking output. It should be appreciated that the following description is directed to an exemplary trailer braking output plot that spans a range of vehicle braking inputs and is specifically directed to an operator-selected gain setting of 60%. In use, trailer brake controller 20 might not determine an entire plot and instead may calculate one or more discrete trailer braking output values that correspond to the particular vehicle braking input value currently being detected, or it may determine multiple trailer braking output plots. Furthermore, gain settings other than 60% could be selected by the operator and used by the present method. Referring to FIG. 4, the exemplary trailer braking output (shown in a heavier line) includes a gain-independent segment 340, a transition segment 342, and one or more gain-dependent segments 344, 346.

Gain-independent segment 340 generally refers to a portion of the overall trailer braking output where the trailer brakes are driven in a more aggressive manner than is typically allowed by the corresponding gain-dependent output plot. For instance, if an operator selects a gain setting of 60%, then conventional trailer braking output follows the gain-dependent output plot 204. The present method, however, recognizes that in low friction environments, the trailer brakes can be controlled in a more aggressive manner; this is why gain-independent segment 340 deviates from plot 204 and instead follows the more aggressive plot 202. The gain-independent segment 340 generally extends until it encounters a first threshold: a gain-dependent threshold or a gain-independent threshold, whichever comes first. In the present example, gain-dependent output plot 204 has a gain-dependent threshold 250 that corresponds with 60% of the maximum realizable output level, while the gain-independent threshold 330 corresponds to approximately 35% of the maximum realizable output level. Therefore, the first threshold level encountered by gain-independent segment 340 is threshold 330, which marks the end of that segment.

Transition segment 342 generally returns the trailer braking output from the more aggressive gain-independent segment 340 to the more conventional gain-dependent output plot 204. Put differently, when the trailer braking output reaches gain-independent threshold 330, it is generally determined that the trailer cannot be braked any more forcefully without potentially causing trailer braking instability. Thus, transition segment 342 maintains the trailer braking output at a fairly constant level until it meets up with gain-dependent output plot 204, at which point the trailer braking output resumes according to conventional gain-dependent segments 344 and 346, which are part of plot 204 and correspond to a gain setting of 60%.

In the aforementioned example where an operator has selected a gain setting of 60%, the present method enables the trailer brake system 10 to temporarily brake more aggressively than would normally be allowed for a 60% gain setting. This additional braking force is graphically illustrated in shaded area 360 and can improve braking, as described above. However, there are some instances when braking according to a gain-independent segment—without further precautions—could lead to over-gaining or over-compensating the trailer brakes. For example, consider a light trailer with a low gain setting that is being lightly braked on a dry road. If the present method were to provide trailer braking output according to gain-independent segment 340 without first determining that the vehicle was operating on a low friction environment, it could result in an over-braking situation. Checking for a low friction environment in step 108 helps to avoid undesirable wheel lockup situations where a trailer is braked on a high friction surface and does not require the additional braking provided by a gain-independent segment. Accordingly, the present method generally provides trailer braking output according to a gain-dependent output plot when in a high and/or medium friction environment, and provides trailer braking output according to a separate plot having one or more gain-independent segments when in a low and/or medium friction environment. The exact point where the trailer braking output transitions from gain-independent to gain-dependent output can be influenced by a whole host of factors, including the particular vehicle or trailer involved, the load of the trailer, and the road conditions, to name but a few.

As previously mentioned, a gain setting of 60% is only one of many possible settings. If the gain setting were 20% instead (gain-dependent output plot 206), then segment 340 would reach gain-dependent threshold 252 before it reached gain-independent threshold 330. In this instance, a transition segment could extend from gain-independent segment 340 all along threshold 252 so that the trailer braking output ramps up quickly initially and is then maintained at a generally constant 20% level, the maximum level for a gain setting of 20%. If a gain setting of 100% is selected, then it may not be necessary to modify the trailer braking output from gain-dependent output plot 202, as the trailer is already being braked in the most aggressive gain-dependent manner possible. It should be pointed out that the scenarios described above are only for exemplary purposes. For instance, the gain-independent segment 340 does not necessarily have to follow along the 100% gain setting plot 202; it could instead follow some other plot, linear or non-linear, that is more or less aggressive than plot 202. It is also possible to adjust or modify different aspects of the gain-independent segments over time. Such an adjustment could be the result of calculations performed within the vehicle or at some back-end facility, for example.

According to another feature, the present method can occasionally or periodically interrupt gain-independent segments 340, 342 in order to prevent prolonged periods of braking at increased levels that could otherwise result in excessive trailer wheel lockup. For example, when gain-independent segment 340 exceeds a certain minimum braking output level, a first timer (T1) could be started. If timer T1 expires and the trailer braking output is still in a gain-independent segment and is still above the minimum braking output level, then the trailer braking output could interrupted or temporarily reduced to some lower level. The duration of this interruption can be determined by a second timer (T2), at the expiration of which trailer braking output resumes according to its previous gain-independent levels. Interrupting the trailer braking output can potentially unlock a trailer wheel that has become locked due to prolonged gain-independent braking.

It is to be understood that the foregoing description is not a definition of the invention, but is a description of one or more preferred exemplary embodiments of the invention. The invention is not limited to the particular embodiment(s) disclosed herein, but rather is defined solely by the claims below. For instance, the particular sequence, order and number of steps can be different than the exemplary embodiments described above. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation

The invention claimed is:

1. A method for determining trailer braking output for a trailer that is towed behind a vehicle, comprising the steps of:
    (a) receiving vehicle braking input that is representative of vehicle braking conditions; and
    (b) if the vehicle braking input indicates the presence of a low friction environment, then determining trailer braking output that has at least one gain-independent segment where trailer brakes are operated in a more aggressive manner in order to compensate for an under-gained or under-braked situation caused by the low friction environment.

2. The method of claim 1, wherein the vehicle braking input of step (a) is representative of desired vehicle braking and is provided by at least one device selected from the group consisting of: a brake switch, a pedal position sensor, a pressure sensor, or an antilock braking system (ABS).

3. The method of claim 2, wherein the vehicle braking input of step (a) further includes an ABS status signal that is provided by an antilock braking system (ABS) and is representative of an operational status of the ABS.

4. The method of claim 1, wherein the vehicle braking input of step (a) is representative of actual vehicle braking and is provided by at least one device selected from the group consisting of: a vehicle speed sensor, a wheel speed sensor, or a vehicle accelerometer.

5. The method of claim 1, wherein the vehicle braking input of step (a) includes a first vehicle braking input representative of driver braking intent (DBI) and a second vehicle braking input representative of a low friction environment.

6. The method of claim 1, wherein the gain-independent segment corresponds to a maximum available gain-dependent trailer braking output.

7. A method for determining trailer braking output for a trailer that is towed behind a vehicle, comprising the steps of:
    (a) receiving vehicle braking input that is representative of vehicle braking conditions and receiving a gain setting; and
    (b) if the vehicle braking input indicates the presence of a low friction environment, then generating trailer braking output that includes at least one gain-independent segment, a gain-dependent scaled segment where the trailer braking output is proportional to the vehicle braking input, and a gain-dependent threshold segment where the trailer braking output is generally constant at a gain-dependent threshold.

8. The method of claim 7, further comprising the step of:
    determining a gain-independent threshold that is generally independent of the gain setting.

9. The method of claim 8, wherein the gain-independent threshold is periodically adjusted.

10. The method of claim 8, wherein the gain-independent segment extends from a starting point to the lesser of the gain-dependent threshold and the gain-independent threshold.

11. A method for determining trailer braking output for a trailer that is towed behind a vehicle, comprising the steps of:
    (a) receiving a gain setting;
    (b) receiving an ABS status signal from an antilock braking system (ABS) that is representative of an operational status of the ABS; and
    (c) if the ABS status signal indicates that the ABS is currently active, then determining trailer braking output that has at least one segment where trailer brakes are braked in a more aggressive manner than the gain setting would normally allow.

12. The method of claim 11, further comprising the step of:
    receiving vehicle braking input in addition to the ABS status signal, wherein the additional vehicle braking input is representative of desired vehicle braking and is provided by at least one device selected from the group consisting of: a brake switch, a pedal position sensor, or a pressure sensor.

13. The method of claim 11, further comprising the step of:
    receiving vehicle braking input in addition to the ABS status signal, wherein the additional vehicle braking input is representative of actual vehicle braking and is provided by at least one device selected from the group consisting of: a vehicle speed sensor, a wheel speed sensor, or a vehicle accelerometer.

14. The method of claim 11, wherein the at least one segment corresponds to a maximum available gain-dependent trailer braking output.

15. A method for determining trailer braking output for a trailer that is towed behind a vehicle, comprising the steps of:
(a) receiving a gain setting;
(b) receiving an ABS status signal from an antilock braking system (ABS) that is representative of an operational status of the ABS; and
(c) if the ABS status signal indicates that the ABS is currently active, then generating trailer braking output that includes at least one segment where the trailer brakes are braked in a more aggressive manner than the gain setting would normally allow, a gain-dependent scaled segment that is proportional to the vehicle braking input and a gain-dependent threshold segment that is generally constant at a gain-dependent threshold.

16. The method of claim 15, further comprising the step of:
determining a gain-independent threshold that is generally independent of the gain setting received in step (a).

17. The method of claim 16, wherein the gain-independent threshold is periodically adjusted.

18. The method of claim 16, wherein the at least one segment is a gain-independent segment that extends from a starting point to the lesser of the gain-dependent threshold and the gain-independent threshold.

19. A method for determining a trailer braking output for a trailer that is towed behind a vehicle, comprising the steps of:
(a) receiving vehicle braking input that includes a first vehicle braking input representative of an operational status of an antilock braking system (ABS) and a second vehicle braking input representative of driver braking intent (DBI);
(b) receiving a gain setting from a gain adjustment device; and
(c) if the first vehicle braking input indicates that the ABS is active, then utilizing the second vehicle braking input and the gain setting to provide trailer braking output that includes at least one gain-independent segment and at least one gain-dependent segment, wherein the gain-independent segment drives trailer brakes in a more aggressive manner than the gain-dependent segment would normally allow.

* * * * *